US 11,245,602 B2

(12) United States Patent
Kaplan

(10) Patent No.: US 11,245,602 B2
(45) Date of Patent: Feb. 8, 2022

(54) CORRELATING NETWORK TRAFFIC TO THEIR OS PROCESSES USING PACKET CAPTURE LIBRARIES AND KERNEL MONITORING MECHANISMS

(71) Applicant: Cybereason, Inc., Boston, MA (US)

(72) Inventor: Gal Kaplan, Tel Aviv (IL)

(73) Assignee: Cybereason Inc., Boston, MA (US)

(*) Notice: Subject to any disclaimer, the term of this patent is extended or adjusted under 35 U.S.C. 154(b) by 0 days.

(21) Appl. No.: 16/579,455

(22) Filed: Sep. 23, 2019

(65) Prior Publication Data

US 2020/0099600 A1  Mar. 26, 2020

Related U.S. Application Data

(60) Provisional application No. 62/735,725, filed on Sep. 24, 2018.

(51) Int. Cl.
*H04L 12/26* (2006.01)
*H04L 12/741* (2013.01)
*H04L 29/12* (2006.01)

(52) U.S. Cl.
CPC .......... *H04L 43/067* (2013.01); *H04L 43/062* (2013.01); *H04L 45/74* (2013.01); *H04L 61/1511* (2013.01)

(58) Field of Classification Search
CPC ... H04L 43/067; H04L 45/74; H04L 61/1511; H04L 43/062; H04L 43/14; H04L 41/14
See application file for complete search history.

(56) References Cited

U.S. PATENT DOCUMENTS

| | | | |
|---|---|---|---|
| 2010/0192201 A1* | 7/2010 | Shimoni | H04L 63/1458 726/3 |
| 2015/0009840 A1* | 1/2015 | Pruthi | H04L 43/106 370/252 |
| 2015/0215177 A1* | 7/2015 | Pietrowicz | H04W 24/10 370/230 |
| 2016/0142931 A1* | 5/2016 | Mondal | H04L 41/0886 370/252 |
| 2016/0164901 A1* | 6/2016 | Mainieri | H04L 63/1425 726/23 |
| 2016/0359887 A1* | 12/2016 | Yadav | H04L 61/1511 |
| 2018/0212989 A1* | 7/2018 | Mavani | H04L 63/1433 |

* cited by examiner

*Primary Examiner* — Djenane M Bayard
(74) *Attorney, Agent, or Firm* — DLA Piper LLP (US)

(57) ABSTRACT

A method of monitoring and reporting of packets including their attribution to their origin processes from a user space application without installing proprietary drivers, rather using only infrastructures and capabilities supplied by the operating system (OS). The method relies on correlation between packets received from a packet capture library and a kernel monitoring mechanism that supplies an event with the process ID which is executed on the same time frame for transmitting or receiving of that traffic. The attribution between the event and the packet is based on the 4-tuple (or other exemplar) that exists on both the event and the packet where the "4-tuple" is a set of: source address, source port, destination address, destination port.

20 Claims, 2 Drawing Sheets

4-Tuple

CORRELATING NETWORK TRAFFIC TO THEIR OS PROCESSES USING PACKET CAPTURE LIBRARIES AND KERNEL MONITORING MECHANISMS

This application is related to, and claims priority from, U.S. Provisional Patent Application No. 62/735,725 filed Sep. 24, 2018. Application 62/735,725 is hereby incorporated by reference in its entirety.

BACKGROUND

Field of the Invention

The present invention relates generally to the field of computer security and more particularly to a method of correlating network traffic to operating system (OS) processes.

Description of the Problem Solved

Identifying the origin of malicious network activity is a key ingredient in a cyber security investigation. Domain Name System (DNS) requests for example, are very valuable for forensics of cyber security incidents and used widely by analysts to identify and investigate attacks. A DNS request is one of the footprints a malware or attacker will always leave behind when it tries to communicate back to their controller, exfiltrate data, perform reconnaissance or attempt to make a lateral movement in the organization. One of the most valuable pieces of data is the attribution of a DNS request to its origin process, because this allows the analyst to track the attack and build a complete picture of the technologies and methods used in the attack. However, the transmitting/receiving process leaves no indication on the packet itself, which means this attribution cannot be gathered by parsing the packets alone. It would be very advantageous to be able to track the attribution of a DNS request.

Domain Name System (DNS) is a particular set of servers on the Internet that map domain names to Internet protocol (IP) addresses. Each website has an IP address; however, the typical browser does not know that IP address when a message or request is sent to the website. Rather, the browser uses a domain name of the form www.xyz.com or the like. In order to access the website, the browser first makes a DNS request with the domain name, and the DNS server returns the actual IP address of the site.

SUMMARY OF THE INVENTION

The present invention allows monitoring and reporting of packets including their attribution to their origin processes from a user space application without installing any proprietary drivers, but rather using only infrastructures and capabilities supplied by the operating system (OS). The method relies on correlation between packets received from a packet capture library and a kernel monitoring mechanism that supplies an event with the process ID which is executed on the same time frame for transmitting or receiving of that traffic. The attribution between the event and the packet is based on the 4-tuple which exists on both the event and the packet (or other examplar). The "4-tuple" is a set of: source address, source port, destination address, destination port that is typically found in a packet header.

DESCRIPTION OF THE FIGURES

Attention is now directed to several figures that illustrate features of the present invention.

Figure 1:
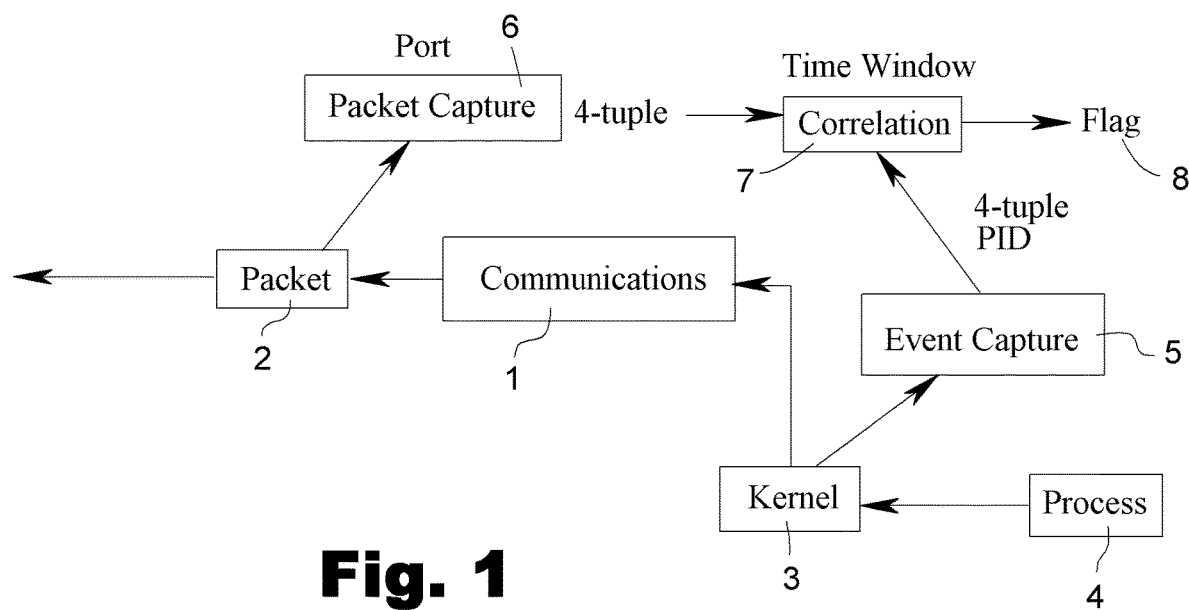
FIG. 1 shows a system that can capture a packet and a kernel packet transmit event.

Several figures have been presented to aid in understanding the present invention. The scope of the present invention is not limited to what is shown in the figures.

DESCRIPTION OF THE PREFERRED EMBODIMENTS

The present invention uses infrastructures and capabilities of the OS to produce the required 4-tuble for a packet, and locate the process that initiated the packet particularly for DNS communications.

This method can be applied on various architectures and operating systems. For example for Linux systems, a packet capturing library can be libpcap, while for Windows, it can be Winpcap or NDISCapture via ETW Provider. For Linux systems, a kernel monitoring mechanism can be Ftrace or Kprobes, and for Windows systems it can be ETW or the Event Viewer.

The acronym pcap stands for packet capture. The program called libpcap is an application interface (API) for generally capturing data packets as they enter or leave a computer communicating on a network of any kind, but in particular the Internet. Libpcap is unique to Unix-like systems such as the various Linux systems and was originally developed at the Lawrence-Berkeley Laboratory. The captured packets can be read using various readily available software tools, or the libpcap data can be read directly by a custom application. Various packet capture modules also exist for Windows including Winpcap (which is no longer supported by Microsoft) and ETW Provider (which can also capture events). ETW stands for Event Tracing for Windows.

Kprobes is a debugging mechanism for the Linux kernel that can also be used for monitoring events inside a system. It can be used to find performance bottlenecks, log specific events, trace problems and the like. A kernel probe is a set of handlers placed on a certain instruction address. A KProbe is defined by a pre-handler and a post-handler. When a KProbe is installed at a particular instruction, and that instruction is executed, the pre-handler is executed just before the execution of the probed instruction. Similarly, the post-handler is executed just after the execution of the probed instruction.

Example of a System and Method

As an example, assume a system that runs on Linux Intel x86_64 architecture and uses KProbes and libpcap as "Events" and "Packet Capture Library" respectively. Using such a system, the present invention can monitor DNS requests and attribute them to their origin processes.

The module libpcap is a packet capture library that provides a high level interface to packet capture systems. All packets on the network, even those destined for other hosts, are accessible through this mechanism. Libpcap supplies an application interface (API) to intercept and receive packets transmitted and received on the machines for parsing and inspection.

As stated, KProbes is a debugging mechanism for the Linux kernel which can also be used for monitoring events. KProbes heavily depends on processor architecture specific features and uses slightly different mechanisms depending on the architecture on which it is being executed. The Kprobes pre/post handlers can chose to print the content of the registers values at the moment of execution. Kprobes has several interfaces for configuration and enablement: the present method focuses on the "debugfs" interface.

The following exemplary method pertains to Linux running on the x86 architecture:

To monitor DNS requests and attribute them to their origin processes, the following steps must be performed:
1. Build an application linked with a traffic capturing library like libpcap
2. Use libpcap to intercept packets transmitted and received on a particular port, e.g., port 53 (DNS servers listen on port 53 for queries from DNS clients).
3. Configure a KProbe to provide events on each transmission of a UDP packet, e.g, the 4-tuple and the process ID of the transmitter
4. For each packet received from libpcap on port 53, save the packet, and index it using the 4-tuple as key
5. For each KProbe event received, save the transmitted process ID, and index it using the 4-tuple as key
6. Map the packet to a process ID (PID) by using the 4-tuple as key when both the packet and the KProbe of the same 4-tuple are received in a gap of no more than approximately one second between them. Issue a report on a PID and DNS request packet attribution.

This correlation can be used to implicate particular processes in malicious activities. For example, if there is an attempt to access a known malicious website, an investigator can attribute this attempt to a given program (or process) and take remedial action (for example, killing the process, erasing the process, warning the user, or other remedial methods).

A similar procedure can be used with Windows using Winpcap or NDISCapture and EventViewer. The intent is to capture the 4-tuple from a packet, and at the same time capture the process ID of the process that originated or received that packet using the 4-tuple. By monitoring Port 53 traffic, the technique can capture DNS requests and responses and attribute them to their origin processes. This allows the investigator to identify which process issued a particular DNS request. This is information that is extremely valuable in a forensic investigation, and it may be the only trace the malware author leaves behind.

FIG. 1 shows a system where packets and kernel packet events are captured. A traffic packet capture program 6 like libpcap monitors a port such as Port 53, and a kernel event capture program such as a KProbe 5 captures kernel events. Further software 7 correlates captured packets with captured kernel packet transmit (or receive) events. In FIG. 1, a process 4 requests the kernel 3 to send a packet. The communications stack 1 transmits the requested packet 2. The packet capture module 6 captures the header 4-tuple from the packet and sends it to the correlation module 7. At the same time, the event capture module 5 captures the 4-tuple and the process ID (PID) from the kernel 3. If correlation occurs within the prescribed time window, typically approximately a second, a flag 8 is generated showing a successful correlation.

Figure 2:
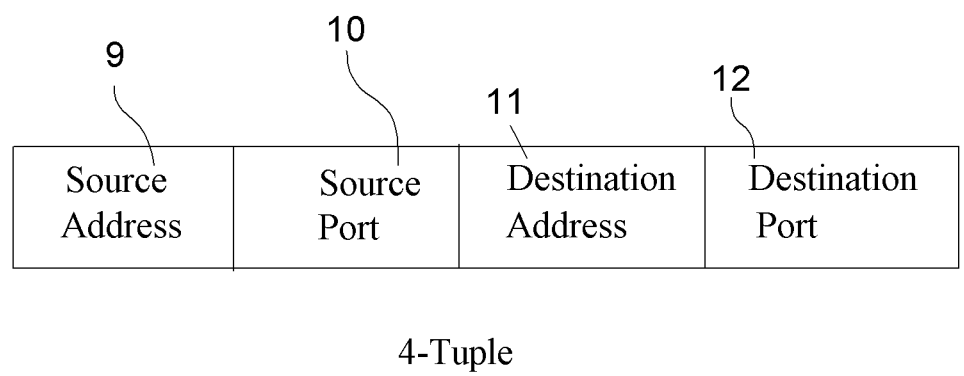
FIG. 2 shows a 4-tuple.

FIG. 2 shows a typical 4-tuple found in the header of a packet. It includes the source address 9, source port 10, destination address 11 and destination port 12.

The present invention allows real-time correlation between communicated packets and the process that initiated or received them. This is done without special drivers, but rather with libraries and tools that exist within the OS or are readily available.

It should be noted that while the above-description of the present invention makes use of the 4-tuple used in a packet header, any exemplar that identifies the packet may be used. In addition, the exemplar may simply be a part of a 4-tuple rather than the entire 4-tuple (such as a 2-tuple of destination address and destination port).

Several descriptions have been given to aid in understanding the present invention. One skilled in the art will realize that numerous changes and variations may be made without departing from the spirit of the invention. Each of these changes and variations is within the scope of the present invention.

The invention claimed is:

1. A method for discovering the origin of network traffic on a computer running an operating system (OS) comprising:
   monitoring, by a first tool of the operating system, a port of the computer for domain name system (DNS) communications;
   upon detecting a DNS communication, capturing, via the first tool, at least packet headers of transmitted or received packets of the DNS communication, said first tool reporting a first exemplar for each packet captured;
   monitoring, by a second tool of the operating system, a kernel of the operating system for kernel events;
   upon detecting a kernel event, identifying, via the second tool, a second exemplar for each packet transmitted or received by the kernel event and a process identification (PID) of the kernel event transmitting or receiving each packet;
   comparing captured first exemplars from the DNS communication to second exemplars from the kernel event;
   determining that the DNS communication and the kernel event occurred within a predetermined time window; and
   based on the determining, reporting the originating PID of the DNS communication when said exemplars match within the predetermined time window.

2. The method of claim 1 wherein each of said first exemplar and said second exemplar is a 4-tuple containing source address, source port, destination address and destination port.

3. The method of claim 1 wherein the predetermined time window is approximately one second.

4. The method of claim 1 wherein the first tool is libpcap.

5. The method of claim 1 wherein the second tool is KProbes.

6. The method of claim 1 wherein the first tool is Winpcap or NDISCapture.

7. The method of claim 1 wherein the second tool is EventViewer.

8. A method for discovering the origin of network traffic on a computer running an operating system (OS) comprising:
   monitoring, by a first tool of the operating system, a port of the computer for domain name system (DNS) communications;
   upon detecting a DNS communication, capturing packet data and an identifying 4-tuple for each packet captured;
   monitoring, by a second tool of the operating system, a kernel of the operating system for kernel events;
   upon detecting a kernel event, capturing, by the second tool, an identifying 4-tuple for each kernel event a process identification (PID) of the kernel event;
   comparing captured 4-tuples from captured packets to 4-tuples from kernel events that occur within a predetermined time window; and reporting the originating PID of the DNS request when said 4-tuples match within the predetermined time window.

9. The method of claim 8 wherein the port is Port 53.

10. The method of claim 8 wherein the predetermined time window is approximately one second.

11. The method of claim 8 wherein the first tool is libpcap.

12. The method of claim 8 wherein the second tool is a KProbe.

13. The method of claim 8 wherein the first tool is Winpcap or NDISCapture.

14. The method of claim 8 wherein the second tool is EventViewer.

15. A method of discovering an origin of network traffic via an operating system of a computer comprising:
   capturing a packet of data from a port of the computer;
   upon capturing the packet, determining a first exemplar identifying the captured packet;
   detecting a kernel packet transmit event by monitoring a kernel of the computer;
   upon detecting the kernel packet transmit event, determining a second exemplar identifying the kernel packet transmit event;
   correlating the captured packet with the kernel packet transmit event in a predetermined time interval by matching the first and second exemplars.

16. The method of claim 15 wherein the correlation occurs when the captured packet and the kernel packet transmit event include the same 4-tuple occurring within the predetermined time interval.

17. The method of claim 16 wherein the predetermined time window is approximately one second.

18. The method of claim 15 wherein the origin of the network traffic implicates a particular process.

19. The method of claim 15 wherein the network traffic is a DNS communication.

20. The method of claim 15 wherein capture of the packet and the kernel packet transmit event are effected by using infrastructures and capabilities supplied by the operating system (OS).

* * * * *